(12) United States Patent
Segal

(10) Patent No.: US 8,201,572 B2
(45) Date of Patent: Jun. 19, 2012

(54) WATER SUPPLY CONTROL APPARATUS AND METHOD FOR USE IN HOMES OR OTHER STRUCTURES

(76) Inventor: Stanley H. Segal, Boca Raton, FL (US)

( * ) Notice: Subject to any disclaimer, the term of this patent is extended or adjusted under 35 U.S.C. 154(b) by 228 days.

(21) Appl. No.: 12/560,094

(22) Filed: Sep. 15, 2009

(65) Prior Publication Data

US 2010/0065126 A1   Mar. 18, 2010

Related U.S. Application Data

(60) Provisional application No. 61/096,881, filed on Sep. 15, 2008, provisional application No. 61/219,159, filed on Jun. 22, 2009.

(51) Int. Cl.
*F15D 1/00* (2006.01)
*F16K 31/02* (2006.01)

(52) U.S. Cl. ............... 137/15.11; 137/312; 251/129.04; 340/605

(58) Field of Classification Search ............ 137/312, 137/15.11, 1; 251/129.04; 340/605
See application file for complete search history.

(56) References Cited

U.S. PATENT DOCUMENTS

| | | | | |
|---|---|---|---|---|
| 5,881,755 A | * | 3/1999 | Dieringer | 251/129.04 |
| 5,992,218 A | * | 11/1999 | Tryba et al. | 137/312 |
| 6,186,162 B1 | * | 2/2001 | Purvis et al. | 137/312 |
| 7,147,204 B2 | * | 12/2006 | Hollingsworth et al. | 251/129.04 |
| 7,460,013 B1 | * | 12/2008 | Osborne et al. | 251/129.04 |
| 7,549,435 B2 | * | 6/2009 | Walter | 137/312 |
| 2010/0045471 A1 | * | 2/2010 | Meyers | 340/605 |

* cited by examiner

*Primary Examiner* — Kevin Lee
(74) *Attorney, Agent, or Firm* — David W. Barman

(57) ABSTRACT

A water supply control apparatus for use in homes or other structures is provided that incorporates a radio frequency transmitter and a receiver regulating the open or closed state of an electrical solenoid valve in fluid communication with a structure's water supply. A by-pass switch enabling manual regulation of the solenoid valve is mounted on the valve itself. Also provided is a method of controlling the flow of water supplied to a structure utilizing radio frequency pulse broadcasts to regulate the open or closed state of the solenoid valve.

14 Claims, 6 Drawing Sheets

WATER SUPPLY CONTROL APPARATUS AND METHOD FOR USE IN HOMES OR OTHER STRUCTURES

INDEX TO RELATED APPLICATIONS

This application claims the benefit of U.S. patent application Ser. No. 61/096,881, filed, Sep. 15, 2008 and U.S. patent application Ser. No. 61/219,159, filed, Jun. 22, 2009, the disclosures of which are incorporated herein by reference in their entirety.

FIELD OF INVENTION

The present invention relates to a convenient home, or other structure, water supply control apparatus and a method for using same.

BACKGROUND OF THE INVENTION

Virtually all owners of improved property recognize the threat to their structures posed by water damage caused by plumbing leakage. Investigation of this problem reveals that cleanup and repair costs attributable to water damage exceed one billion dollars annually. It destroys wallboard, wallpaper and paint, electrical fixtures and wiring, carpeting and padding, vinyl flooring, subflooring, and all manner of furniture and decorative items. Irreplaceable items such as financial records, photos, and mementos are destroyed beyond retrieval. Additionally, the occupants of the damaged property can expect to be driven from their structures during cleanup and repairs. Following such repairs, the structure will likely be permanently subject to mildew and related odors.

Structural water damage due to plumbing leakage occurs most often while the occupants are not present. Causes of such leakage range from frozen pipes that break resulting in water flow when thawing occurs, broken lines connected to shut-off valves attached to toilet tanks, refrigerator ice-makers, dishwashers, or a broken hose connected to a washing machine. The breaks in these lines are often caused by the nearly instantaneous closing of associated valves. Such closing causes a hammering effect on the line, in turn causing breakage in any weak areas.

Many people do not know the location of the main water shut-off valve in their structure. In addition, it is often the case that water leakage occurs due to a natural catastrophe, which is typically accompanied by an electrical power outage. Because water damage can be severe in a relatively short amount of time, a search throughout a structure, particularly a darkened one, for the water shut-off valve can result in disaster.

What is needed in the art is an apparatus allowing a structure's occupant to conveniently turn off the water supply to his or her structure each time they leave. Additionally, in the event of a power outage, the apparatus should enable automatic shutoff of the structure's water supply, thereby alleviating the necessity of manual shut-off. The present invention accomplishes these objectives by utilizing a battery-operated radio frequency wall switch transmitter and an electrical plug-in receiver controlling an electrical solenoid valve or electrically-actuated ball valve in fluid communication with a structure's water supply. When plugged in to an energized electrical wall outlet, the default setting of the solenoid valve is open, thus allowing water flow through the valve and into the structure. In the event of a power outage with concomitant loss of power to the wall outlet, the solenoid valve closes thereby preventing water flow into the structure. The solenoid valve incorporates a by-pass switch allowing, if desired, water flow through the line into the structure during a power outage. When activated, the wall switch transmitter broadcasts a radio frequency pulse to the receiver which in turn shuts the solenoid valve off, thereby preventing water flow into the structure. Upon deactivation, the wall switch transmitter broadcasts a second radio frequency pulse to the receiver which in turn opens the solenoid valve, thereby allowing water flow into the structure.

SUMMARY OF THE INVENTION

The primary aspect of the present invention is to provide an apparatus allowing a structure's occupant to conveniently turn off the water supply to his or her structure each time they leave.

Another aspect of the present invention is to provide an apparatus that enables automatic shut-off of the structure's water supply in the event of a power outage, thereby alleviating the necessity of manual shut-off.

Another aspect of the present invention is to provide an automatic water supply shut-off apparatus incorporating a by-pass switch allowing, if desired, water flow through the line into the structure during a power outage.

Another aspect of the present invention is to provide a method of conveniently controlling the ingress of water flow into a structure.

Additional aspects, advantages and novel features of the invention will be set forth in part in the description which follows, and in part will become apparent to those skilled in the art upon examination of the following or may be learned by practice of the invention. The aspects and advantages of the invention may be realized and attained by means of the instrumentalities and combinations particularly pointed out in the appended claims.

The present invention provides an apparatus allowing a structure's occupant to conveniently turn off the water supply to his or her structure each time they leave. Additionally, in the event of a power outage, the apparatus enables automatic shut-off of the structure's water supply, thereby alleviating the necessity of manual shut-off. The present invention accomplishes these objectives by utilizing a battery-operated radio frequency wall switch transmitter and an electrical plug-in receiver controlling an electrical solenoid-valve or electrically-actuated ball valve in fluid communication with a structure's water supply. When plugged in to an energized electrical wall outlet, the default setting of the solenoid valve is open, thus allowing water flow through the valve and into the structure. In the event of a power outage with concomitant loss of power to the wall outlet, the solenoid valve closes thereby preventing water flow into the structure. The solenoid valve incorporates a by-pass switch allowing, if desired, water flow through the line into the structure during a power outage. When activated, the wall switch transmitter broadcasts a radio frequency pulse to the receiver which in turn shuts the solenoid valve off, thereby preventing water flow into the structure. Upon deactivation, the wall switch transmitter broadcasts a second radio frequency pulse to the receiver which in turn opens the solenoid valve, thereby allowing water flow into the structure.

In one embodiment, the solenoid is actuated or switched off by a water sensor that transmits a signal. Water sensors may be placed on the floor near sinks, toilets, bathtubs, water heaters and the like. If water is detected, the sensor can transmit a signal to the solenoid to shut off and prevent additional water from entering through the main water line.

In one embodiment, in the event of a power failure, the valve will remain in the position it was in at the time the power failed. For example, if the system had detected a leak and shut the valve off, and there was a subsequent power failure, the valve would remain in the closed position and therefore prevent continued leak or flooding. When the power resumed, it would again retain its position. If the valve was open, it will stay open. If it was closed, it will stay closed. The system may provide optimal protection during a power failure, by using an Uninterruptible Power Supply (UPS) back-up power system.

The present invention further relates to a method of controlling the flow of water supplied to a structure through main water supply plumbing of the structure comprising the steps of:

energizing a receiver;

providing a transmitter actuated by a water sensor in close proximity to said receiver;

placing a fluid flow regulator in fluid communication with the main water supply plumbing of the structure;

serially electrically connecting said receiver to said fluid flow regulator;

broadcasting a first radio frequency pulse selected from a plurality of frequencies from said transmitter to said receiver thereby setting said fluid flow regulator to a closed state; and broadcasting a second radio frequency pulse selected from a plurality of frequencies from said transmitter to said receiver thereby setting said fluid flow regulator to an open state.

The transmitter and receiver are each constructed and arranged to select from 256 possible frequencies. The selection of a single unique frequency in which the receiver is configured to only turn on and off power based on a reception of a signal on the single frequency eliminates the possibility of an undesired shut off of power in the system.

In one embodiment, the receiver is a radio frequency receiver and the transmitter is a radio frequency transmitter.

The said fluid flow regulator is a solenoid valve that is an electrically-actuated ball valve.

The present invention also includes a method of controlling the flow of water supplied to a plurality of sinks in a single room through water supply plumbing of the system comprising the steps of:

energizing a receiver;

providing a transmitter actuated by remote control with said receiver;

placing at least one fluid flow regulator in fluid communication with any of the main water supply, water supply to specific groups, water supply to individual sink fixtures, or combinations thereof;

electrically connecting said receiver to said fluid flow regulator;

broadcasting a first radio frequency pulse from said transmitter to said receiver thereby setting said fluid flow regulator to a closed state; and broadcasting a second radio frequency pulse from said transmitter to said receiver thereby setting said fluid flow regulator to an open state.

The system of the present invention wirelessly controls water flow in a building potable water heater with components comprising:

a. a relay switch attached to an electric supply of a water heater;

b. a radio frequency on-off relay switch;

wherein said relay switch attached to an electric supply of a water heater is operatively connected to a radio frequency on-off relay switch and said radio frequency on-off relay switch is actuated from a remote wireless actuator.

The system has a solenoid valve connected to a main water supply line such that when said solenoid is actuated, said system ceases water delivery through said main water supply line and ceases electric supply to said water heater.

The present invention also includes a system for wirelessly controlling water flow in a building comprising:

a. an electronic solenoid valve connected to a water supply;

b. a water sensor with wireless transmitter and alarm siren;

c. a radio frequency on-off relay switch;

wherein said water sensor is operatively connected to said radio frequency on-off relay switch and said radio frequency on-off relay switch is actuated from a signal when said water sensor detects water, the detection of water being an event that turns off the electronic solenoid valve connected to a water supply that subsequently stops water flow in said water supply.

The system event turns off said radio frequency on-off relay switch that turns off the electronic solenoid valve connected to a water supply also turns off electric to a potable water heater.

DESCRIPTION OF THE PREFERRED EMBODIMENT

Figure 1:
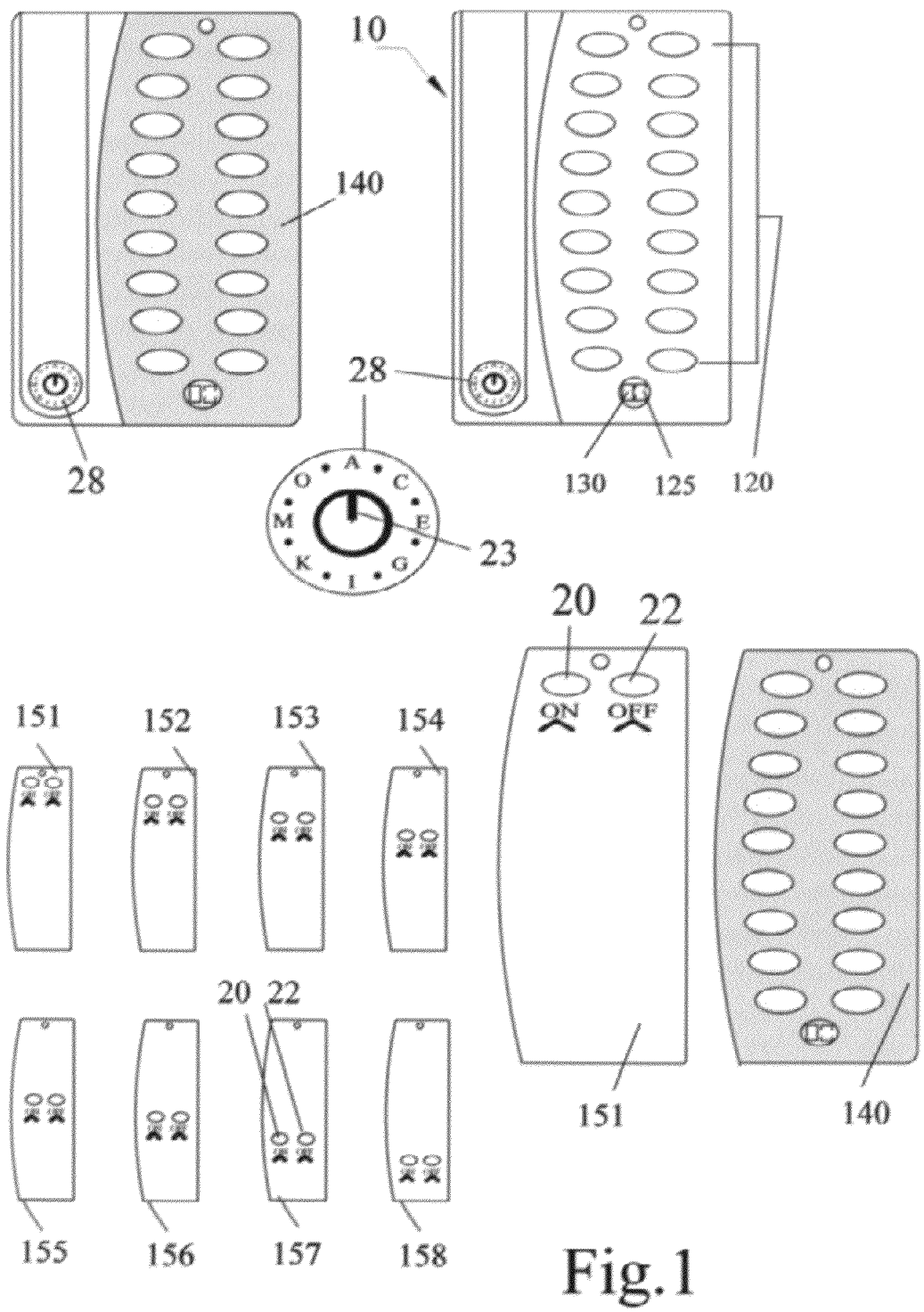
FIG. 1 shows a transmittal unit configurable for 256 separate transmission codes.
Figure 2:
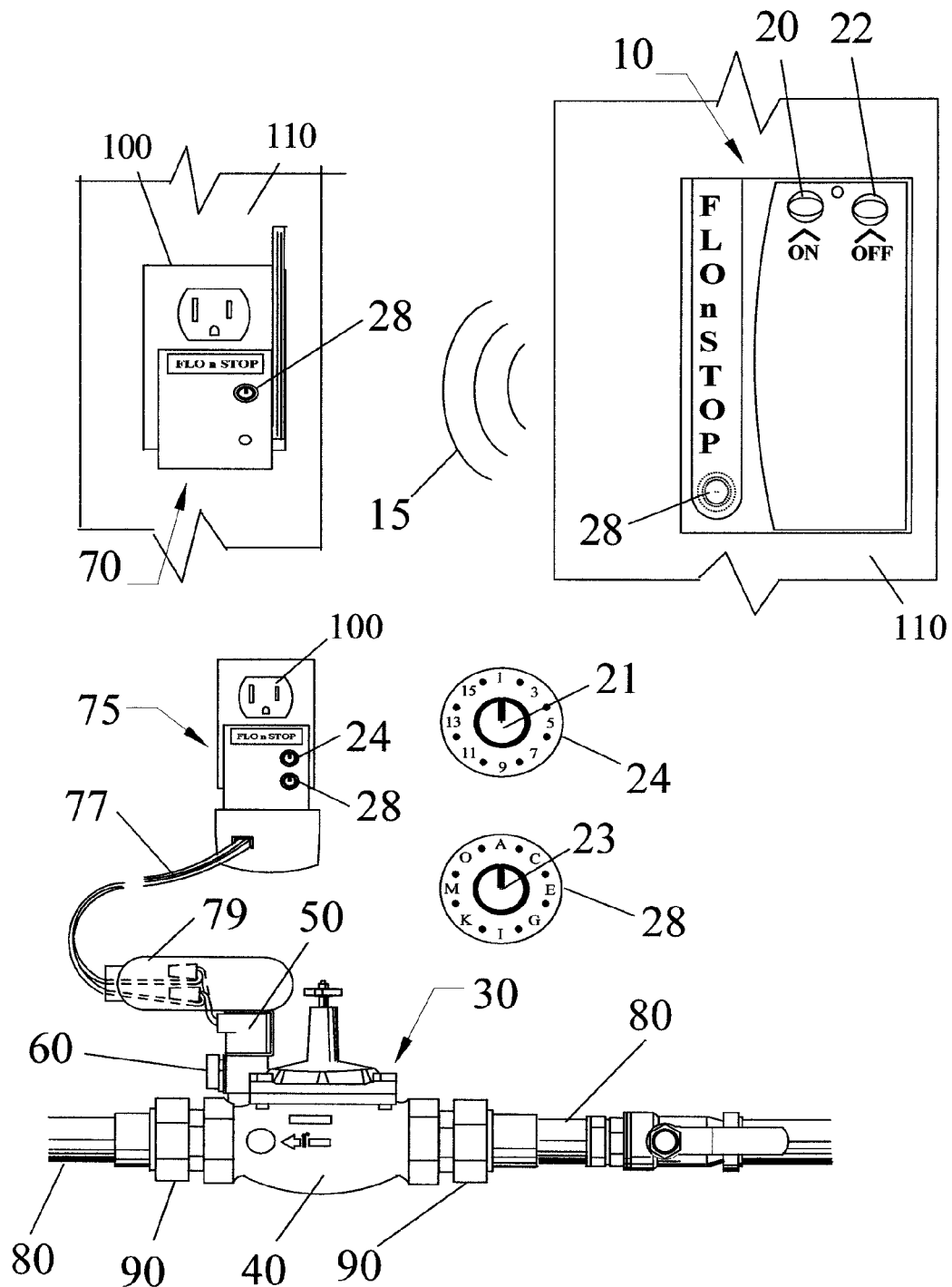
FIG. 2 are components of a home water supply shut-off apparatus actuated by a transmittal unit of FIG. 1.

Transmitter 10 is controlled by an incorporated electrical switch 20 and 22. In the embodiment shown in FIGS. 1-5, switch 20 sends a wireless signal to receiver 70 and receiver 70 turns on electricity to solenoid-valve assembly 30 and switch 22 sends a wireless signal to receiver 70 and interrupts or turns off electricity to solenoid valve assembly 30. Solenoid valve assembly 30 has valve body 40 with attached solenoid 50 and by-pass switch 60. Solenoid 50 is in serial electrical connection with plug-in receiver 70.

Solenoid-valve assembly 30 is serially connected to water supply piping 80 by compression nuts 90. Plug-in receiver 70 is connected to wall electrical outlet 100. Transmitter 10 is attached to wall 110 in close proximity to, that is, in operative range of, plug-in receiver 70. When wall electrical outlet 100 supplies electrical power, solenoid 50 is in an open state, thereby allowing water to flow through valve body 40 and into the structure. When electrical power to electrical outlet 100 is interrupted, solenoid 50 changes to a closed state, thereby preventing water from flowing through valve body 40 and into the structure. By-pass switch 60 may be pressed in and rotated clockwise in order to open solenoid 50, thereby allowing water flow through valve body 40. By-pass switch 60 may be rotated counter-clockwise in order to close solenoid 50, thereby preventing water flow through valve body 40. When electrical switch 20 is activated, transmitter 10 broadcasts a radio frequency pulse to plug-in receiver 70 which in turn sets solenoid 50 to a closed state, thereby preventing water from flowing through valve body 40 and into the structure. When electrical switch 20 is deactivated, transmitter 10 broadcasts a second radio frequency pulse to plug-in receiver 70 which in turn sets solenoid 50 to an open state, thereby allowing water flow through valve body 40 and into the structure.

Valve body 40 is serially connected to water supply piping 80. Water flow through valve body 40 is controllably prevented or allowed by either solenoid 50 or by-pass switch 60.

As shown in FIG. 1, transmitter 10 has an accompanying faceplate 140. Faceplate 140 has a plurality of perforated orifices that correspond with buttons 120 on transmitter 10. Toggle switch position 125 selects a first transmission mode and toggle switch position 130 selects a second transmission mode. Transmitter 10 has a rotatable dial selecter 28 with a central rotatable select switch 23 that moves and corresponds to indicia for varying transmission from transmitter 10. FIG. 1 includes examples of selecting openings in faceplate 140. Configuration 151 selects buttons 120 in the first position of each column. By the term "selects, it is meant that the openings in faceplate 140 correspond to the first switch 120 in the first column of transmitter 10 and the first switch 120 of the second column of switches 120 on transmitter 10. Configuration 152 selects buttons 120 in the second position of each column. Configuration 153 selects buttons 120 in the third position of each column. Configuration 154 selects buttons 120 in the fourth position of each column. Configuration 155 selects buttons 120 in the fifth position of each column. Configuration 156 selects buttons 120 in the sixth position of each column. Configuration 157 selects buttons 120 in the seventh position of each column. Configuration 158 selects buttons 120 in the eighth position of each column. Using combinations of two of switches 120 and sixteen positions on rotatable selecter switch 23, transmitter 10 has 256 separate possible combinations of signal transmission. Receiver 75 is configured with first code selector 24 and second code selector 28 that are configured to receive a signal from transmitter 10. The configuration of transmitter 10 with a receiver 75 using a single code selected from 256 possible codes allows the system of the invention to be used in an environment, such as an apartment or office building, without having a transmitter interrupt power to a solenoid apparatus 30 other than the particular solenoid apparatus 30 designated.

Solenoid apparatus 30 has electric valve actuator 50 connected to power line junction box 79. Power line junction box 79 has a power supply cord 77 connected to receiver 75 and receiver 75 is connected to a source of power. A standard household receptacle 100 is one source of power, however, the present invention is not limited to power from household receptacle 100.

Figure 3:
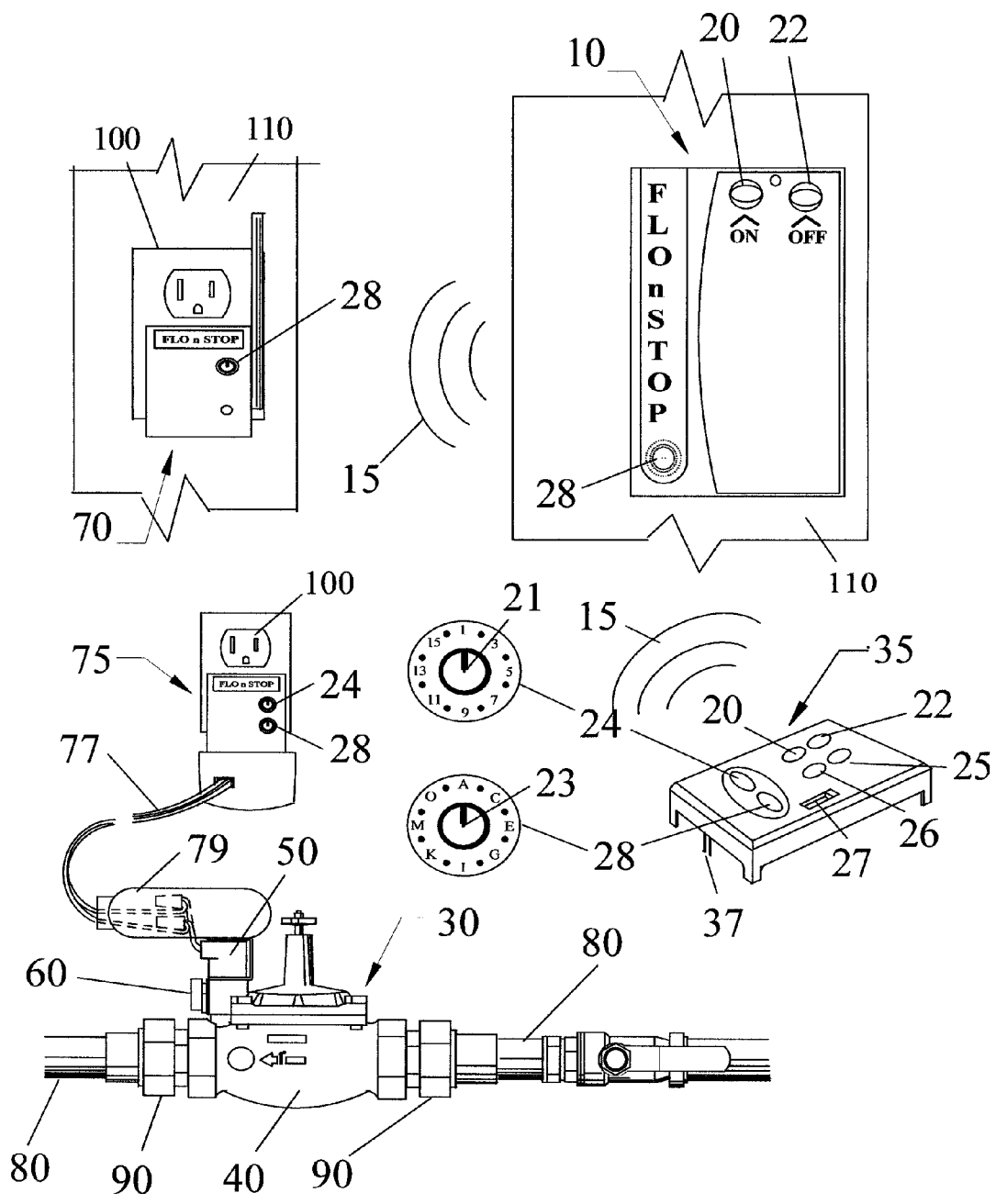
FIG. 3 are components of a home water supply shut-off apparatus actuated by either a transmittal unit of FIG. 1 or a water sensor.

In the embodiment of FIG. 3, floor sensor 35 has water sensory probes 37. When water is detected by probes 37 a wireless signal 15 is transmitted to receiver 70 and electricity is turned off to valve actuator 50. Valve assembly 30 then prevents flow of water from water supply 80. Floor sensor 35 has manual switches 20 and 22 as found on transmitter 10. Floor sensor 35 further has a manual sensor test 25 and a sensor reset button 26 incorporated thereon. Floor sensor 35 has first code selector 24a and second code selector 28b corresponding to first code selector 24 and second code selector 28 of receiver 75 such that transmission of an actuated signal from floor sensor 35 only sends a signal that is received by a receiver 70 similarly configured. Configuration of receiver 70 and floor sensor 35 to one of 256 possible transmission signals prevents floor sensor from actuation a system other than the one for which it is configured and positioned nearby.

Another aspect of the invention relates to an apparatus and method to wirelessly control electric potable water heaters.

Figure 4:
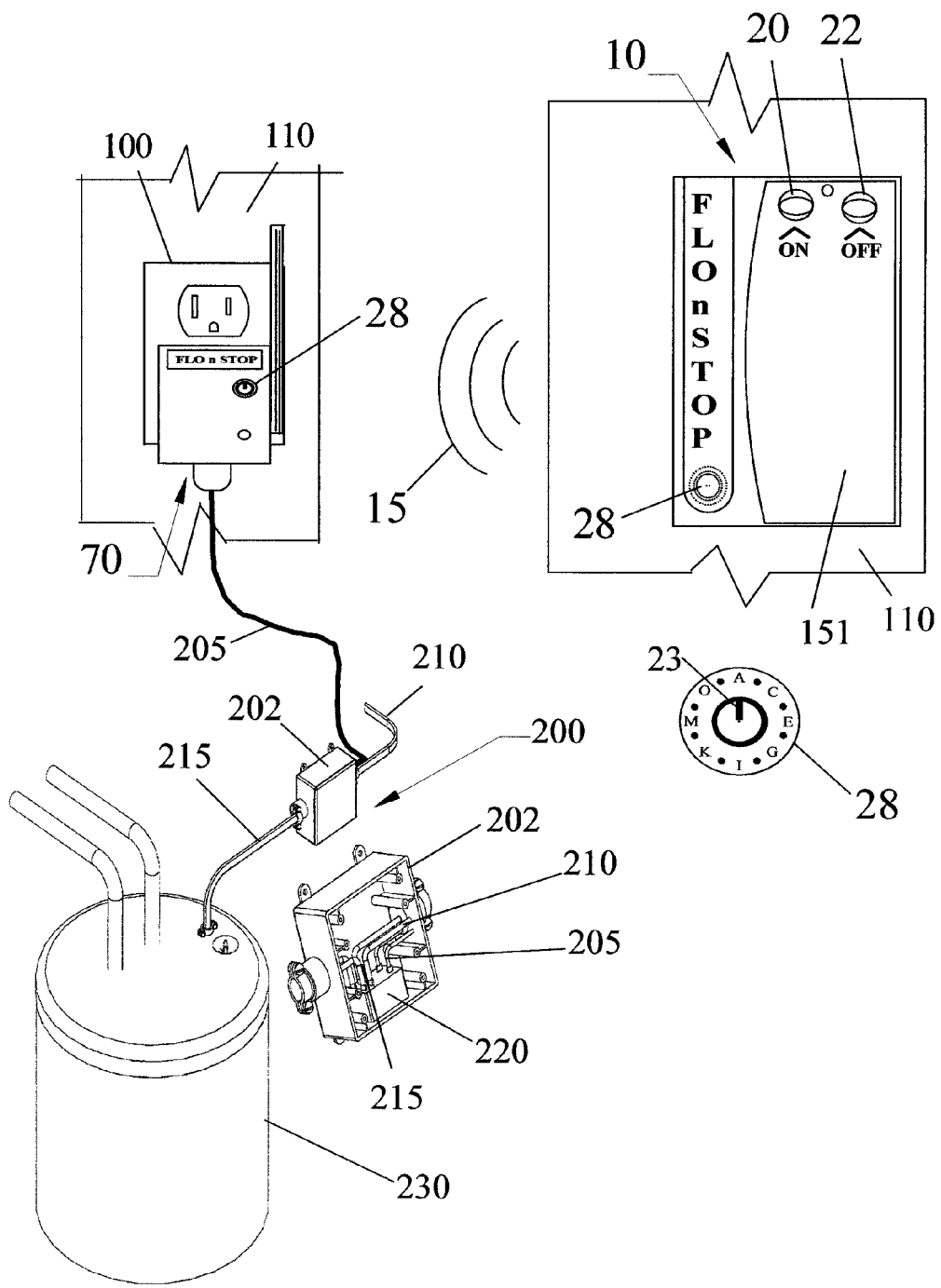
FIG. 4 are components of a home water supply shut-off apparatus connected to electrical input of a water heater.

As shown in FIG. 4 a conventional electric water heater 230 has power line 215 connected to component box 202. Box 202 has an internal power line 205 operatively connected to Single Pole Double Throw (SPDT) switch 220. Second internal power line 210 from circuit breaker box connects to SPDT relay switch 220. Transmitter 10 wirelessly actuated receiver 70 and interrupts electricity to water heater 230.

Figure 5:
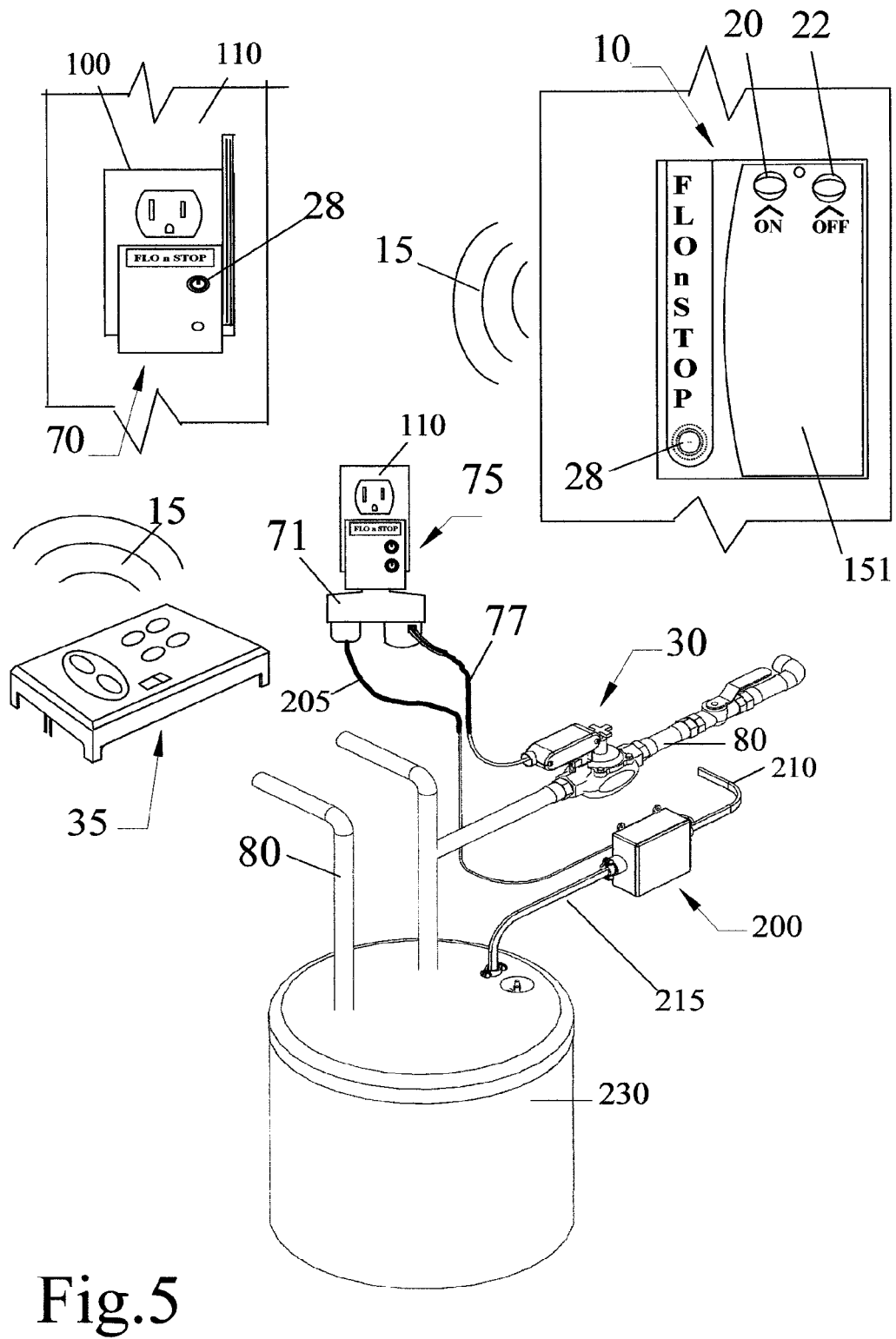
FIG. 5 are components of a water supply shut-off apparatus connected to the inlet of a water heater and controlled by a wireless actuator or a water sensor.

In another embodiment, as shown in FIG. 5, floor sensor 35 is configured to actuate receiver 70 and said actuation interrupts and ceases electricity supply to solenoid assembly 30. The lack of electricity to solenoid assembly 30 prevents water from entering from supply line 80.

Figure 6:
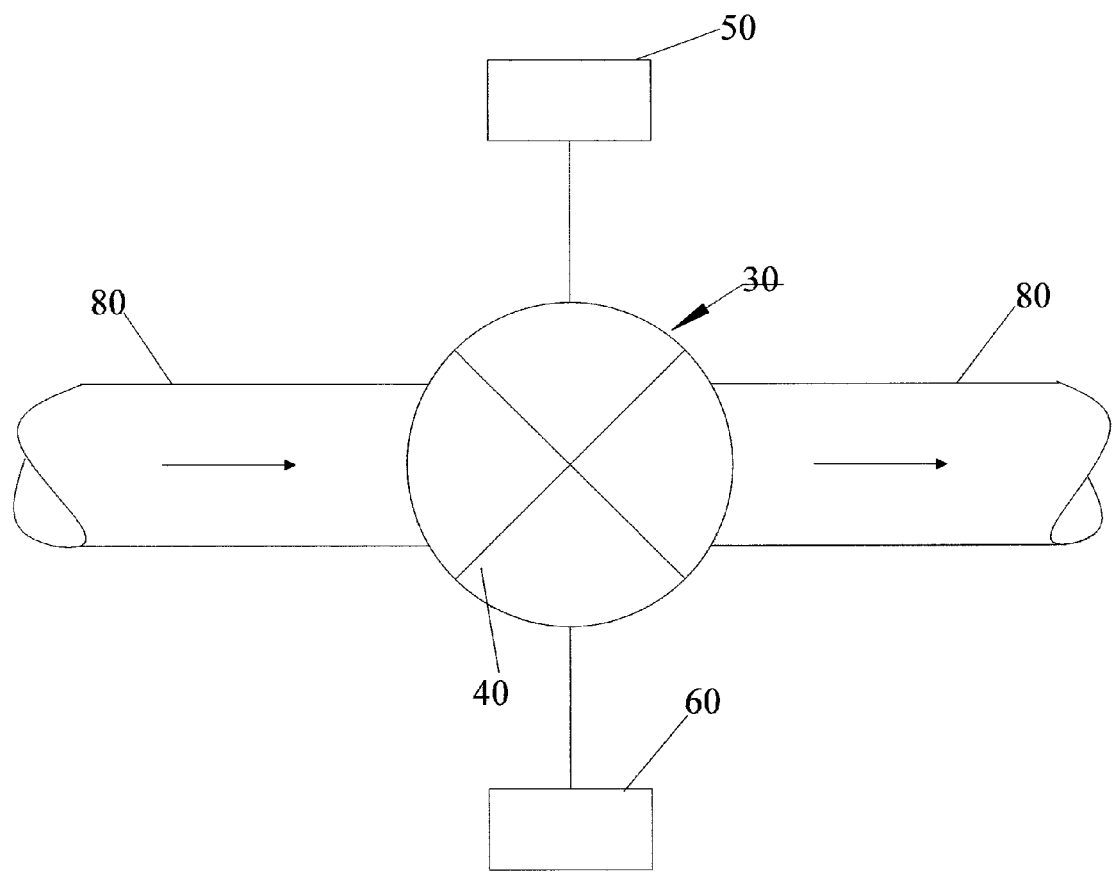
FIG. 6 is a schematic showing components of an electronic solenoid valve with manual override.

FIG. 6 is a schematic showing water supply pipe 80 in which solenoid apparatus 30 has been inserted. Solenoid apparatus 30 has a valve 40 that is open when supplied with electricity and closes upon the cessation of electricity by valve actuator 50. In the event of a power failure, solenoid apparatus 30 is equipped with a manual override 60 which opens valve 40 and permits water in supply pipe to flow therethrough.

In one embodiment, an electric supply control apparatus for use in homes or other structures is provided that incorporates a battery-operated radio frequency transmitter 10 and an electrical plug-in receiver 70 regulating the open or closed state of a 120VAC electrical relay switch 220 that opens or closes the contacts of a 240VAC switch connected between the electrical circuit breaker 210 and the potable electric hot water heater 230. Also provided is a method of controlling the receiver 70 utilizing radio frequency pulse broadcasts to regulate the open or closed state of the relay switch 220.

The present invention also relates to a novel apparatus and method which allows for an easy and convenient system for shutting off and turning on an electric water heater 230 in order to save the homeowner money and conserve electric energy. Prior to the art of this invention the dwelling potable water heater 230 can only be controlled at the dwelling circuit breaker box. Presently it is not convenient for the homeowner to turn off the power to the potable water heater 230 when leaving the dwelling for any length of time.

Improving energy efficiency is a first and most important step toward achieving sustainability in buildings and organizations. Energy efficiency helps control rising energy costs, reduces environmental footprints, and saves money for the homeowner. The current invention provides for a simple apparatus and method, conveniently located at an exit/entry to the dwelling to easily turn off the electric to the potable electric water heater 230 when the dwelling is unoccupied. Upon returning to the dwelling the electric power to the electric water heater 230 is quickly and easily restored at the entry to the dwelling. Most residential dwellings are unoccupied during the hours of 9 AM thru 5 PM. And during the hours of 10 PM thru and 6 AM the demand for potable hot water is not as great as between 5 PM and 10 PM. Electrical energy conservation is an important element of energy policy. Energy conservation reduces the energy consumption and energy demand per capita and thus offsets some of the growth in energy supply needed to keep up with population growth. This reduces the rise in energy costs, and can reduce the need for new power plants, and energy imports. The reduced energy demand can provide more flexibility in choosing the most preferred methods of energy production. By reducing emissions, energy conservation is an important part of lessening climate change. Energy conservation facilitates the replacement of non-renewable resources with renewable energy. Energy conservation is often the most economical solution to energy shortages, and is a more environmentally benign alternative to increased energy production.

The present invention further relates to a novel apparatus and method which allows for an easy, convenient and automatic system for shutting off the main water supply to a dwelling or structure when uncontrolled water is detected on the floor. A battery operated water sensor apparatus 35 sounds a 102 db alarm siren while simultaneously transmitting a radio frequency signal 15 to the plugged in receiver relay switch 70 that activates the closure of the solenoid valve 40 in main water supply line 80 to the dwelling or structure.

The area of flood control is one that has received considerable attention from engineers, inventors, property owners and insurance companies. As anyone who has experienced a flood can readily attest, the damage caused by an interior flood can be quite severe.

The worst interior flooding occurs when there is no one at home or when the entire household is sleeping.

The current invention provides for a simple apparatus and method, conveniently located on the floor at the base of all water appliances in a dwelling. The current floor sensor apparatus 35 detects uncontrolled water on the floor reaching a height of 1/32" in a given area due to leaking or broken pipes, leaking of or pressure deteriorated water controlled fixtures, bursting of or damaged hoses, at any time of the day or night.

The apparatus is particularly well suited for offices, apartments and condominiums, or any facility where units are individually secured and share a common radio frequency controlled solenoid activated main water shut-off valve system. In such a setting when the floor sensor apparatus 35 detects uncontrolled water, a radio frequency signal 15 is transmitted to receiver 70. Receiver 70 shuts off of the main water solenoid valve 40 in solenoid assembly 30 and sounds an alarm siren to identify the location where uncontrolled water is detected. The unit owner, facility manager or maintenance person can then easily and quickly determine the location of the water detected and affect a shut off of the appliance causing the uncontrolled water on the floor with minimal damage or loss to the property.

Once the cause of the uncontrolled water has been determined and rectified the main water supply is once again restored to the on position.

The present invention relates to a novel apparatus and method which allows for an easy, convenient method to turn off both the main water supply line and the electric power to the electric potable hot water heater simultaneously at will, or when leaving a dwelling or other structure unoccupied, and restore both water and electric power simultaneously at will, or when returning to the dwelling.

While the invention has been described in its preferred form or embodiment with some degree of particularity, it is understood that this description has been given only by way of example and that numerous changes in the details of construction, fabrication, and use, including the combination and arrangement of parts, may be made without departing from the spirit and scope of the invention.

I claim:

1. A water supply control apparatus comprising:
   a fluid flow regulator;
   a radio frequency receiver in serial electrical connection with said fluid flow regulator enabling state control of said fluid flow regulator by changing a state of said fluid flow regulator upon receipt of a radio frequency pulse, said receiver constructed and arranged to receive a unique signal from a selected plurality of signals; and
   a water sensor having a radio frequency transmitter configured with a first code selector and a second code selector providing said water sensor radio frequency transmitter a configuration of transmitting a single unique signal from a plurality of user selectable frequencies, enabling state control of said fluid flow regulator by transmitting a unique radio frequency pulse to said receiver, said transmitter constructed and arranged to transmit a single unique frequency selected from a plurality of user selectable signals, said transmission of said unique frequency corresponding to a pre selected unique frequency selected in said radio frequency receiver; said transmission and reception of said signal actuating the closing of said fluid flow regulator.

2. The apparatus of claim 1 wherein said fluid flow regulator further comprises a solenoid valve.

3. The apparatus of claim 1 wherein said fluid flow regulator further comprises an electrically-actuated ball valve.

4. The apparatus of claim 1 further comprising a manual adjuster mounted to said fluid flow regulator enabling state control of said fluid flow regulator.

5. The apparatus of claim 4 wherein said manual adjuster further comprises a knob.

6. The apparatus of claim 1 wherein said transmitter is battery-powered.

7. The apparatus of claim 1 wherein said transmitter is wall-mounted.

8. A method of controlling the flow of water supplied to a structure through main water supply plumbing of the structure comprising the steps of:
   energizing a receiver, wherein said receiver is configured to receive signals from a user selected plurality of signals;
   providing a transmitter actuated by a water sensor in close proximity to said receiver, said transmitter being part of a water sensor having a radio frequency transmitter configured with a first code selector and a second code selector providing said water sensor a radio frequency transmitter a configuration of transmitting a unique signal from a plurality of frequencies, enabling state control of said fluid flow regulator by transmitting a unique radio frequency pulse to said receiver, said transmitter constructed and arranged to transmit a single unique frequency selected from a plurality of signals, said transmission of said unique frequency corresponding to a pre selected unique frequency selected in said radio frequency receiver; said transmission and reception of said signal actuating the closing of said fluid flow regulator;
   placing a fluid flow regulator in fluid communication with the main water supply plumbing of the structure;
   serially electrically connecting said receiver to said fluid flow regulator;
   broadcasting a first radio frequency pulse selected from a plurality of frequencies from said transmitter to said receiver thereby setting said fluid flow regulator to a closed state; and
   broadcasting a second radio frequency pulse selected from a plurality of frequencies from said transmitter to said receiver thereby setting said fluid flow regulator to an open state.

9. The method of claim 8 wherein said receiver further comprises a radio frequency receiver.

10. The method of claim 8 wherein said fluid flow regulator further comprises a solenoid valve.

11. The method of claim 8 wherein said fluid flow regulator further comprises an electrically-actuated ball valve.

12. The method of claim 8 for controlling the flow of water supplied to a plurality of sinks in a single room through
- a water supply plumbing of the system comprising the steps of:
- placing at least one fluid flow regulator in fluid communication with supplied to a plurality of sinks in a single room;
- electrically connecting said receiver to said fluid flow regulator;
- broadcasting a first radio frequency pulse from said transmitter to said receiver thereby setting said fluid flow regulator to a broadcasting a second radio frequency pulse from said transmitter to said receiver thereby setting said fluid flow regulator to an open state.

13. A system for wirelessly controlling water flow in a building potable water heater comprising:
- a. a relay switch attached to an electric supply of a water heater;
- b. a radio frequency on-off switch connected to said relay switch and operatively associated with a receiver;
- wherein said relay switch attached to an electric supply of a water heater is operatively connected to a radio frequency on-off relay switch and said radio frequency on-off relay switch is actuated from a remote wireless actuator, said remote wireless actuator being a water sensor having a radio frequency transmitter configured with a first code selector and a second code selector providing said water sensor radio frequency transmitter a configuration of transmitting a single unique signal from a plurality of user selectable frequencies, enabling state control of said fluid flow regulator by transmitting a unique radio frequency pulse to said receiver, said transmitter constructed and arranged to transmit a single unique frequency selected from a plurality of user selectable signals, said transmission of said unique frequency corresponding to a pre selected unique frequency selected in said radio frequency receiver; said transmission and reception of said signal actuating the closing of said fluid flow regulator.

14. The method of claim 13 further having a solenoid valve connected to a main water supply line such that when said on-off switch is actuated, said system and method ceases water delivery through said main water supply line and ceases electric supply to said water heater.

* * * * *